United States Patent
Mack et al.

(10) Patent No.: US 11,360,012 B2
(45) Date of Patent: Jun. 14, 2022

(54) VIBRONIC SENSOR

(71) Applicant: Endress+Hauser SE+Co. KG, Maulburg (DE)

(72) Inventors: Benjamin Mack, Lörrach (DE); Tobias Brengartner, Emmendingen (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 13 days.

(21) Appl. No.: 16/956,307

(22) PCT Filed: Nov. 14, 2018

(86) PCT No.: PCT/EP2018/081175
§ 371 (c)(1),
(2) Date: Sep. 23, 2020

(87) PCT Pub. No.: WO2019/120768
PCT Pub. Date: Jun. 27, 2019

(65) Prior Publication Data
US 2020/0340896 A1 Oct. 29, 2020

(30) Foreign Application Priority Data
Dec. 19, 2017 (DE) .................... 10 2017 130 527.0

(51) Int. Cl.
*G01N 9/00* (2006.01)
*G01F 23/296* (2022.01)
*G01N 11/16* (2006.01)

(52) U.S. Cl.
CPC ......... *G01N 9/002* (2013.01); *G01F 23/2967* (2013.01); *G01N 11/16* (2013.01); *G01N 2009/006* (2013.01)

(58) Field of Classification Search
CPC .. G01N 9/002; G01N 11/16; G01N 2009/006; G01F 23/2967
See application file for complete search history.

(56) References Cited

U.S. PATENT DOCUMENTS 3,145,559 A * 8/1964 Banks .................. G01F 23/2967
73/32 A
4,383,443 A * 5/1983 Langdon ............. G01F 23/2966
73/290 V (Continued)

FOREIGN PATENT DOCUMENTS

CN 1934426 A 3/2007
CN 102472653 A 5/2012
(Continued)

*Primary Examiner* — John Fitzgerald
(74) *Attorney, Agent, or Firm* — Mark A. Logan; Endress+Hauser (USA) Holding Inc.

(57) ABSTRACT

Disclosed is an apparatus for determining a process variable of a medium in a containment, comprising a first oscillatory element and a second oscillatory element, a first driving/receiving unit and a second driving/receiving unit, and an electronics, wherein the first driving/receiving unit is embodied to excite the first oscillatory element by means of a first electrical excitation signal to execute mechanical oscillations, and to receive the mechanical oscillations of the first oscillatory element and to convert such into a first electrical, received signal, wherein the second driving/receiving unit is embodied to excite the second oscillatory element by means of a second electrical excitation signal to execute mechanical oscillations, and to receive the mechanical oscillations of the second oscillatory element and to convert such into a second electrical, received signal, and wherein the electronics is embodied to determine the process variable from the first received signal and/or the second received signal.

14 Claims, 3 Drawing Sheets

(56) References Cited

U.S. PATENT DOCUMENTS

| | | | | |
|---|---|---|---|---|
| 4,922,745 | A * | 5/1990 | Rudkin | G01N 11/16 |
| | | | | 73/32 A |
| 5,323,638 | A * | 6/1994 | Langdon | G01N 9/002 |
| | | | | 73/32 A |
| 5,717,383 | A * | 2/1998 | Dreyer | G01F 23/2967 |
| | | | | 310/318 |
| 6,494,079 | B1 * | 12/2002 | Matsiev | G01H 13/00 |
| | | | | 73/24.05 |
| 6,820,469 | B1 * | 11/2004 | Adkins | G01H 13/00 |
| | | | | 73/24.06 |
| 8,294,337 | B2 * | 10/2012 | Kawai | H01L 41/1132 |
| | | | | 310/370 |
| 8,297,112 | B2 | 10/2012 | Müller | |
| 8,362,854 | B2 * | 1/2013 | Furuhata | H03H 9/215 |
| | | | | 333/200 |
| 9,473,070 | B2 * | 10/2016 | Pfeiffer | G01F 23/2967 |
| 9,709,475 | B2 * | 7/2017 | D'Angelico | G01N 11/16 |
| 10,107,670 | B2 * | 10/2018 | Dreyer | G01N 11/00 |
| 10,481,060 | B2 * | 11/2019 | Chaudoreille | G01N 9/002 |
| 10,502,670 | B2 * | 12/2019 | Goodbread | G01N 9/002 |
| 10,557,826 | B2 * | 2/2020 | Kuhnen | G01N 11/16 |
| 2002/0178787 | A1 | 12/2002 | Matsiev et al. | |
| 2008/0072667 | A1 * | 3/2008 | Mueller | G01F 23/2967 |
| | | | | 73/290 V |
| 2009/0205411 | A1 * | 8/2009 | Muller | G01N 9/002 |
| | | | | 73/64.53 |
| 2011/0063041 | A1 * | 3/2011 | Yamada | H03H 9/1021 |
| | | | | 331/158 |
| 2011/0214502 | A1 | 9/2011 | Zhang | |
| 2013/0139576 | A1 * | 6/2013 | Goodbread | G01N 9/002 |
| | | | | 73/64.53 |
| 2014/0320224 | A1 * | 10/2014 | Pfeiffer | G01N 11/16 |
| | | | | 331/154 |
| 2014/0352427 | A1 * | 12/2014 | Dreyer | G01F 23/2967 |
| | | | | 73/290 V |
| 2016/0223381 | A1 | 8/2016 | Weinzierle et al. | |
| 2017/0241954 | A1 * | 8/2017 | Kuhnen | G01N 29/022 |
| 2018/0224318 | A1 * | 8/2018 | Blodt | G01N 33/2847 |

FOREIGN PATENT DOCUMENTS

| | | |
|---|---|---|
| CN | 103620351 A | 3/2014 |
| CN | 104081171 A | 10/2014 |
| DE | 3734077 C2 | 4/1989 |
| DE | 10050299 A1 | 4/2002 |
| DE | 10057974 A1 | 5/2002 |
| DE | 10241401 A1 | 3/2004 |
| DE | 20320382 U1 | 6/2004 |
| DE | 102004050494 A1 | 5/2006 |
| DE | 102005013242 A1 | 10/2006 |
| DE | 102005015547 A1 | 10/2006 |
| DE | 102006033819 A1 | 1/2008 |
| DE | 102006034105 A1 | 1/2008 |
| DE | 102007043811 A1 | 3/2009 |
| DE | 102008050326 A1 | 4/2010 |
| DE | 102009026685 A1 | 12/2010 |
| DE | 102009028022 A1 | 2/2011 |
| DE | 102010030982 A1 | 1/2012 |
| DE | 102012100728 A1 | 8/2013 |
| DE | 102015102834 A1 | 9/2016 |
| DE | 102015112543 A1 | 2/2017 |
| DE | 102007013557 A1 | 1/2018 |
| DE | 102016112743 A1 | 1/2018 |
| EP | 0282251 A2 | 9/1988 |

* cited by examiner

VIBRONIC SENSOR

CROSS-REFERENCE TO RELATED APPLICATIONS

The present application is related to and claims the priority benefit of German Patent Application No. 10 2017 130 527.0, filed on Dec. 19, 2017 and International Patent Application No. PCT/EP2018/081175, filed on Nov. 14, 2018 the entire contents of which are incorporated herein by reference.

TECHNICAL FIELD

The invention relates to an apparatus for determining and/or monitoring at least one process variable of a medium 2 in a containment. The process variable is, for example, a fill level, especially a limit level, the density and/or the viscosity of the medium 2. The containment can be, for example, a container or a pipeline.

BACKGROUND

Vibronic sensors are widely used in process and/or automation technology. In the case of fill level measuring devices, such have at least one mechanically oscillatable unit, such as, for example, an oscillatory fork, a single tine or a membrane. Such is excited during operation by means of a driving/receiving unit, frequently in the form of an electromechanical transducer unit, such that mechanical oscillations are executed. The electromechanical transducer unit can be, for example, a piezoelectric drive or an electromagnetic drive. The mechanically oscillatable unit can be embodied in the case of flowmeters, however, also as an oscillatable tube, which is flowed through by the medium 2, such as, for example, in a measuring device working according to the Coriolis principle.

Corresponding field devices are produced by the applicant in great variety and in the case of fill level measuring devices, for example, sold under the mark, LIQUIPHANT or SOLIPHANT. The underpinning measuring principles are known, in principle, from a large number of publications. The driving/receiving unit excites the mechanically oscillatable unit by means of an electrical excitation signal, such that mechanical oscillations are executed. Conversely, the driving/receiving unit can receive the mechanical oscillations of the mechanically oscillatable unit and convert them into an electrical, received signal. The driving/receiving unit is correspondingly either a separate driving unit and a separate receiving unit, or a combined driving/receiving unit.

In such case, the driving/receiving unit is in many cases part of a fedback, electrical, oscillatory circuit, by means of which the exciting of the mechanically oscillatable unit occurs, such that mechanical oscillations are executed. For example, for a resonant oscillation, the oscillatory circuit condition must be fulfilled, according to which the amplification factor is and all phases arising in the oscillatory circuit add to a multiple of 360°.

For exciting and fulfilling the oscillatory circuit condition, a certain phase shift between the excitation signal and the received signal must be assured. Therefore, frequently, a predeterminable value for the phase shift is set, thus, a desired value for the phase shift between the excitation signal and the received signal. For this, the most varied of solutions, both analog as well as also digital methods, are known from the state of the art. In principle, the setting of the phase shift can be performed, for example, by use of a suitable filter, and also by means of a control loop controlled to a predeterminable phase shift, the desired value. Known from DE102006034105A1 is, for example, use of an adjustable phase shifter. The additional integration of an amplifier with adjustable amplification factor for additional control of the oscillation amplitude is, in contrast, described in DE102007013557A1. DE102005015547A1 provides the application of an allpass filter. The setting of the phase shift is, moreover, possible by means of a so-called frequency sweep, such as disclosed, for example, in DE102009026685A1, DE102009028022A1, and DE102010030982A1. The phase shift can, however, also be controlled by means of a phase control loop (phase locked loop, PLL) to a predeterminable value. Such an excitation method is shown in DE00102010030982A1.

Both the excitation signal as well as also the received signal are characterized by frequency $\omega$, amplitude A and/or phase $\phi$. Correspondingly, changes in these variables are usually taken into consideration for determining the particular process variable, such as, for example, a predetermined fill level of a medium in a containment, and even the density and/or viscosity of a medium or the flow of a medium through a pipe. In the case of a vibronic limit level switch for liquids, it is distinguished, for example, whether the oscillatable unit is covered by the liquid or freely oscillating. These two states, the free state and the covered state, are, in such case, distinguished, for example, based on different resonance frequencies, thus, a frequency shift. The density and/or viscosity can, in turn, be ascertained with such a measuring device only when the oscillatable unit is covered by the medium.

As described, for example, in DE10050299A1, the viscosity of a medium can be determined by means of a vibronic sensor based on the frequency-phase curve ($\phi=g(\omega)$). This procedure is based on the dependence of the damping of the oscillatable unit on the viscosity of the medium. In such case, the lower the viscosity, the steeper the frequency-phase curve falls. In order to eliminate the influence of the density on the measurement, the viscosity is determined based on a frequency change caused by two different values for the phase, thus, by means of a relative measurement. In this regard, either two different phase values can be set and the associated frequency change determined, or a predetermined frequency band is moved through and it is determined, when at least two predetermined phase values are achieved.

Known from DE102007043811A1, moreover, is to ascertain a change of viscosity from a change of the eigenfrequency and/or resonant frequency and/or the phase difference and/or to determine the viscosity based on correspondedly stored dependencies of the oscillations of the oscillatable unit on the viscosity of the medium. Also in the case of this procedure, the dependence of the determination of viscosity on the density of the medium must be taken into consideration.

Known for determining and/or monitoring the density of a medium from DE10057974A1 are a method as well as an apparatus, by means of which the influence of at least one disturbing variable, for example, the viscosity, on the oscillation frequency of the mechanically oscillatable unit can be ascertained and correspondingly compensated. In DE102006033819A1, it is, furthermore, described to set a predeterminable phase shift between the excitation signal and the received signal, in the case of which effects of changes of the viscosity of the medium on the mechanical oscillations of the mechanically oscillatable unit are negligible.

The empirical assumption, that the measurement is independent of viscosity in the case of a certain predeterminable phase shift, leads, however, to basic limitations. Above a certain viscosity, the described measuring principles can no longer assure an exact measuring of the density. Thus, for each medium, a maximum allowable viscosity must be determined, up to which the density determination can be performed. In order to avoid this problem, DE102015102834A1 provides a vibronic sensor as well as a method for its operation, by means of which the density and/or the viscosity are determinable in an expanded application domain. The analytical measuring principle proposed there takes into consideration the interactions between the oscillatable unit and the medium. The sensor is operated at two different predeterminable phase shifts and the process variables, density and/or viscosity, are ascertained from the response signal. Comprehensive reference is taken to this German patent application in the following.

In German patent application No. 102016112743.4, which was unpublished as of the earliest filing date of this application, it is, furthermore, described to determine from the received signal of the vibronic sensor at the predeterminable phase shift a damping and/or a variable dependent on the damping, and to ascertain the density and/or the viscosity of the medium at least from the damping and/or a variable dependent on the damping, and from the frequency of the excitation signal. Also comprehensive reference is taken to this patent application in the following.

SUMMARY

Starting from the state of the art, an object of the present invention is to provide a vibronic sensor having a high accuracy of measurement and an expanded application domain.

The object is achieved by an apparatus for determining and/or monitoring at least one process variable of a medium in a containment, comprising first and second oscillatory elements, first and second driving/receiving units, and an electronics. According to the invention, the first driving/receiving unit is embodied to excite the first oscillatory element by means of a first electrical excitation signal to execute mechanical oscillations, and to receive the mechanical oscillations of the first oscillatory element and to convert them into a first electrical, received signal. The second driving/receiving unit is, in turn, embodied to excite the second oscillatory element by means of a second electrical excitation signal to execute mechanical oscillations, and to receive the mechanical oscillations of the second oscillatory element and to convert them into a second electrical, received signal, and the electronics is embodied to determine the process variable from the first and/or second received signal.

The idea of the present invention is to excite at least two oscillatory elements separately from one another, such that mechanical oscillations are executed, and to receive the oscillations of the oscillatory elements separately. The separate evaluation of the received signals of the first and second oscillatory elements enables a comprehensive evaluation of the oscillatory behavior of the sensor as regards the at least one process variable. If, for example, a vibronic sensor with an oscillatable unit in the form of an oscillatory fork is used, the received signal is always a superpositioning of the oscillations of the two oscillatory tines of the oscillatable unit. A separated evaluation of the oscillatory movements of the two oscillatory tines forming the oscillatory fork is especially not possible, because the two oscillatory tines are excited together to execute oscillations by means of a membrane, to which they are secured.

Advantageously, the two oscillatory elements can be excited both equally as well as also in different ways, such that mechanical oscillations are executed. The oscillations of the two oscillatory tines can, for example, differ as regards their amplitudes, the phase shift between the excitation signals and received signals or relative to their frequency. Also, different oscillation modes, different oscillation forms, and even different oscillation directions can be produced in the at least two oscillatory tines.

In an embodiment of the vibronic sensor of the invention, the process variable is a predeterminable fill level, the density or the viscosity of the medium.

A preferred embodiment provides that the electronics is embodied to determine a first process variable from the first received signal and a second process variable from the second received signal. With the vibronic sensor of the invention, thus, two process variables can be determined essentially simultaneously, especially uninfluenced by one another.

Alternatively, also the same process variable can be determined by means of the two received signals. In such case, it is possible to determine the process variable in different ways. Such is especially advantageous relative to the achievable accuracy of measurement. Because of the implementing of two different measuring principles for determining a process variable by means of the first, and second, oscillatory elements, the best suited measuring principles and, associated therewith, the particular oscillatory elements can be selected, for example, media dependently.

Advantageously, the electronics unit is, furthermore, embodied to ascertain from the first and/or second received signal the presence of an accretion on at least one of the oscillatory elements. Concerning detection of accretion, reference is made to DE102004080494A1, to which comprehensive reference is taken. Such describes exciting a mechanically oscillatable unit in the form of an oscillatory fork in two different oscillation modes, wherein one of the two oscillation modes is selected in such a manner that it is independent of the medium, into which the oscillatable unit extends at least partially and/or at times. Transferred to the present invention, an option would be, thus, an exciting of the first oscillatory mode for the first oscillatory element and an exciting of the second oscillatory mode for the second oscillatory element. Advantageously, a detection of possibly present accretion can be performed simultaneously with the determining and/or monitoring of the particular process variable.

The at least two oscillatory elements can, on the one hand, be embodied equally. They can, however, also be embodied differently, especially with respect to the dimensions, or geometry, of the oscillatory elements. Likewise, the two oscillatory elements can be arranged in the most varied of ways relative to at least one additional component of the apparatus. For example, the two oscillatory elements can be arranged symmetrically relative to one another or symmetrically relative to at least one additional component of the apparatus. If the at least two oscillatory elements are secured, for example, on a disc shaped element, especially toward its edge, then they can, for example, be arranged symmetrically to the center of the disc shaped element.

In an embodiment, at least the first or second oscillatory element, preferably both oscillatory elements, are mounted on a disc shaped element, preferably the same disc shaped element. This disc-shaped element serves for the present invention not as a membrane, but only for securing the oscillatory elements. However, also other securements of the at least two oscillatory elements on at least one component of the apparatus provide other options and fall within the scope of the present invention.

By targeted selection of the geometry and/or the arrangement of the oscillatory elements, their interaction with the medium can be specially influenced. In this regard, a wide variety of embodiments are available, which all fall within the scope of the present invention. The embodiments to be described here are to be viewed as especially preferred examples and not as an exclusive listing of possible embodiments.

Regarding the geometry of the at least two oscillatory elements, one embodiment of the apparatus of the invention provides that at least the first or the second oscillatory element is rod-shaped. Thus, at least one of the two oscillatory elements is a rod shaped element with predeterminable length as well as predeterminable shape and/or footprint. The length of the oscillatory element is preferably selected in such a manner that it is at least partially and/or at times in contact with the medium. In the case, in which the at least one process variable is the density and/or the viscosity, a complete covering of the oscillatory elements with the medium is required, at least at times.

Another preferred embodiment of the apparatus of the invention provides that a paddle is formed terminally on the first or second oscillatory element or both.

Still another preferred embodiment of the apparatus of the invention provides that a footprint at least of the first or second oscillatory element is embodied perpendicularly to a longitudinal axis of the oscillatory element in such a manner that a base of the footprint is longer than a height of the footprint. In other words, a length of the footprint, or cross sectional area, is greater than a width of the footprint, or cross sectional area.

In this regard, the footprint is advantageously rectangular, rectangular with rounded corners, oval or elliptical.

Besides the geometry and arrangement of the oscillatory elements, also the embodiment and arrangement of the driving/receiving units plays a deciding role. Vibronic sensors are usually excited to execute resonant oscillations of a predeterminable oscillatory mode. Bebases such oscillations, in the case of which the oscillatory movement, at least of the center of gravity of the oscillatable unit, extends essentially in a plane, for example, also the exciting of torsional oscillations is known. Thus, for example, a rod shaped oscillatory element having a footprint can oscillate in different planes relative to a base of the footprint, for example, parallel or perpendicular thereto.

It is, for example, on the one hand, possible to excite the at least two oscillatory elements both to execute oscillations in one plane, in different planes, and even both to torsional oscillations. Likewise it is possible to excite one oscillatory element to execute torsional oscillations and the other oscillatory element to execute oscillations in a plane, or to excite both oscillatory elements to execute oscillations in different planes.

Thus, a preferred embodiment of the apparatus of the invention provides that the first oscillatory element and/or the first driving/receiving unit are arranged and/or embodied in such a manner that the first oscillatory element executes oscillations in a first predeterminable, especially imaginary, plane and that the second oscillatory element and/or the second driving/receiving unit are arranged and/or embodied in such a manner that the second oscillatory element executes oscillations in a second predeterminable, especially imaginary, plane, and that the first and second planes have a first predeterminable angle between one another. The oscillation directions of the first and second oscillatory elements are, thus, different in this embodiment. The two driving units are then, for example, each suitably embodied for producing oscillations of the oscillatory elements in the two planes.

In this embodiment, the first predeterminable angle advantageously amounts to 90°. The two oscillatory elements oscillate then perpendicularly relative to one another.

Likewise advantageously, the first and the second oscillatory element are equally embodied and/or arranged symmetrically relative to one another.

In the case of an equal, especially rod-shaped embodiment of the two oscillatory elements with equal footprints, then, for example, the two bases of the footprints extend in parallel with one another, especially in the same plane. For example, the two oscillatory elements can be positioned opposite one another. If, furthermore, the first predeterminable angle amounts to 90°, then the first plane extends in parallel with the base of the footprint and the second plane extends perpendicularly to the base of the footprint.

Because of this embodiment, it is achieved that the first oscillatory element has an increased sensitivity relative to the density of the medium, while the second oscillatory element has an increased sensitivity relative to the viscosity of the medium.

The first oscillatory element oscillates perpendicularly to the base of the footprint. The interaction of the first oscillatory element is, thus, maximized with reference to a compressive force acting between the oscillatory element and the medium, which force depends, in turn, on the density of the medium. The second oscillatory element oscillates, in contrast, in parallel with the base of the footprint. Here, a frictional force acting between the base of the footprint and the medium is maximized, this force, in turn, depending on the viscosity of the medium. Regarding the derivation of the acting compressive force and frictional force, reference is made again to DE102015102834A1, where the oscillatory movements of a vibronic sensor are described based on an analytical model. There likewise the interaction forces between the sensor and the medium are a theme, especially the compressive force and the frictional force.

Another preferred embodiment of the apparatus of the invention provides, in contrast, that the first oscillatory element and/or the first driving/receiving unit and the second oscillatory element and/or the second driving/receiving unit are arranged and/or embodied in such a manner that the first and second oscillatory elements execute oscillations in a predeterminable, especially imaginary, third plane. Both oscillatory elements execute, in this case, oscillations in the same plane.

In such case, it is especially advantageous that at least the first and second oscillatory elements are differently embodied, or that the two oscillatory elements are arranged differently relative to at least one additional component of the apparatus. In this embodiment, the particular interaction with the medium can, thus, especially be influenced by the different arrangement and/or embodiment of the two oscillatory elements. The two driving/receiving units can, in such case, be embodied both equally as well as also differently.

In the case of a rod-shaped embodiment of the two oscillatory elements with equal footprints, the two bases of the footprints have, for example, a second predeterminable angle between one another. The second predeterminable angle can amount to, for example, 90°, so that, in the case of equally embodied driving/receiving units in the case of the first oscillatory element, the base of the footprint extends in parallel with the oscillation direction, thus, with the third plane, while, in the case of the second oscillatory element, the base of the footprint extends perpendicularly to the oscillation direction. Also for this example of an embodiment, thus, the first oscillatory element has an increased sensitivity relative to the density of the medium, while the second oscillatory element has an increased sensitivity relative to the viscosity of the medium.

An embodiment of the apparatus of the invention provides that at least the first or second oscillatory element has a hollow space, wherein at least the first or second driving/receiving unit is arranged at least partially within the hollow space. Regarding this embodiment, reference is made especially to DE102012100728A1, to which likewise comprehensive reference is taken in the context of the present invention.

Another embodiment provides that at least the first or second oscillatory element, preferably both oscillatory elements, is/are mounted on a disc shaped element, preferably the same, disc shaped element.

In an especially preferred embodiment, the apparatus includes at least four oscillatory elements. Here, different possibilities provide options. On the one hand, each of the four oscillatory elements can be excited individually to execute oscillations and the oscillations can also be individually determined and evaluated. In such case, the apparatus preferably includes likewise four driving/receiving units. It is, however, likewise an option to join, in each case, two oscillatory elements to form a pair of oscillatory elements, similarly to an oscillatory fork known from the state of the art. The two oscillatory elements of each pair can then, for example, be equally embodied and/or symmetrically embodied relative to one another. On the one hand, one driving/receiving unit can be used for each a pair of oscillatory elements. It is, however, also possible, in spite of this, to use four individual driving/receiving units.

Regarding an apparatus of the invention with four oscillatory elements, a preferred embodiment provides that, in each case, two oscillatory elements are equally embodied and symmetrically arranged relative to one another, especially wherein the first and a third oscillatory element, or the second and a fourth oscillatory element are equally embodied and arranged symmetrically relative to one another. Because of the pairwise symmetric arrangement, a force transfer from the oscillatory elements to other components of the apparatus can be advantageously minimized. The apparatus is, in this way, thus, best decoupled from a process connection of the containment for the medium.

In the case of securing the four oscillatory elements on a disc shaped element, then, advantageously, each two oscillatory elements are arranged pairwise opposite one another at the same distance from the center of the disc shaped element, especially the first and third oscillatory elements are arranged opposite one another at the same distance from the center of the disc shaped element and the second and fourth oscillatory elements are arranged opposite one another at the same distance from the center of the disc shaped element.

BRIEF DESCRIPTION OF THE DRAWINGS

The invention as well as its advantageous embodiments will now be described in greater detail based on the appended drawing, the figures of which show as follows.

DETAILED DESCRIPTION

Figure 1:
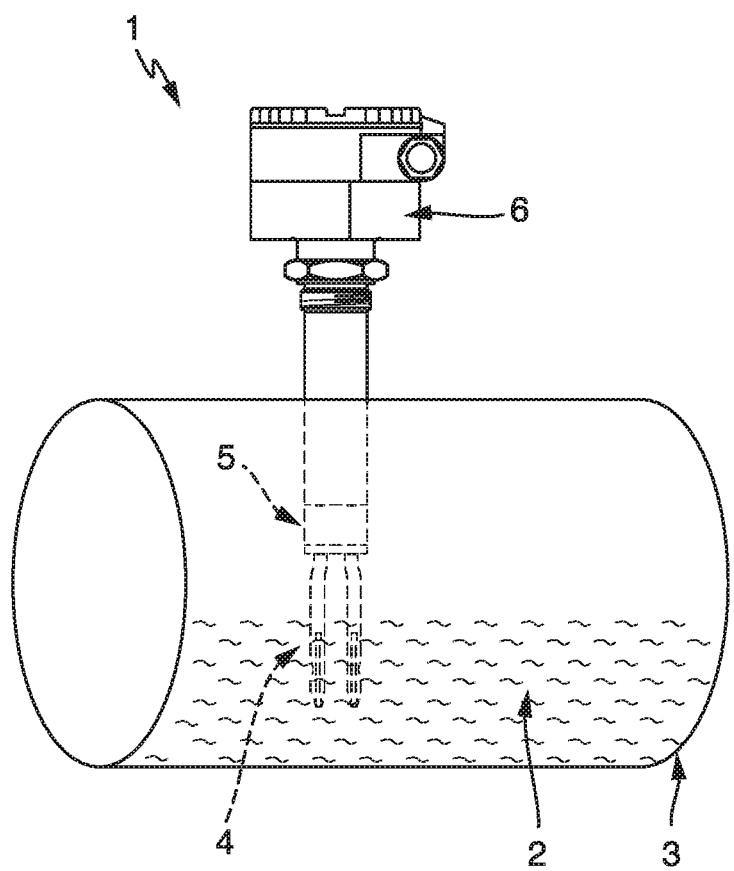
FIG. 1 shows a schematic view of a vibronic sensor according to the state of the art.

FIG. 1 shows a vibronic sensor 1. The sensor includes a mechanically oscillatable unit 4 in the form of an oscillatory fork, which is immersed partially in a medium 2, which is located in a containment 3. The oscillatable unit 4 is excited by means of the exciter/receiving unit 5, such that mechanical oscillations are executed. The exciter/receiving unit 5 can be, for example, a piezoelectric stack- or bimorph drive. Other vibronic sensors use, for example, an electromagnetic driving/receiving unit 5. It is possible to use a single driving/receiving unit 5, which serves for exciting the mechanical oscillations as well as for receiving them. Likewise an option, however, is to provide separate driving and receiving units. Shown in FIG. 1, furthermore, is an electronics unit 6, by means of which signal registration, —evaluation and/or—feeding occurs.

Figure 2:
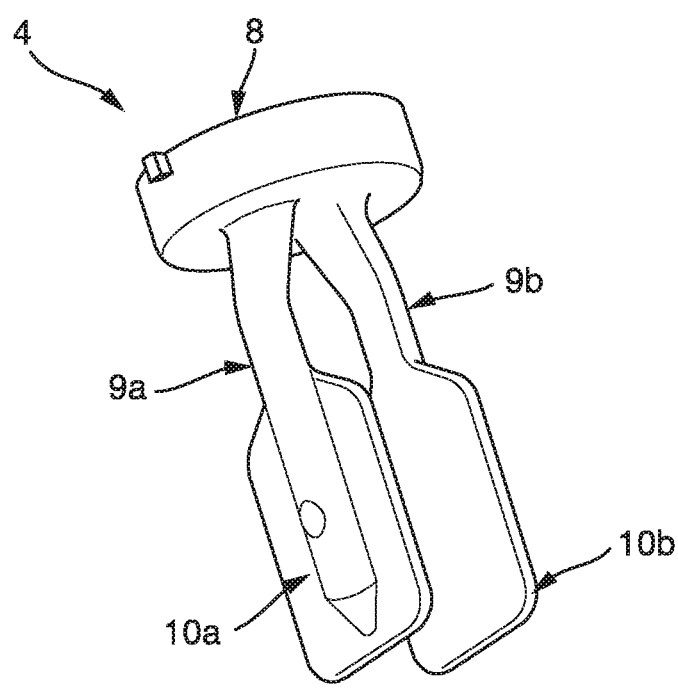
FIG. 2 shows a schematic drawing of an oscillatory fork.

FIG. 2 shows an oscillatable unit 4 in the form of an oscillatory fork, such as used, for example, in the vibronic sensor 1 sold by the applicant under the mark, LIQUIPHANT. The oscillatory fork 4 includes, attached to a membrane 8, two oscillatory tines 9a,9b, on each of a terminal paddle 10a, 10b which is formed. Such are consequently also referred to as fork tines. Secured on the oscillatory tines 9a,9b far face of the membrane 8 by means of material bonding and/or force interlocked connection is the driving/receiving unit 5. For this embodiment shown by way of example, it is assumed that the driving/receiving unit 5 comprises at least one piezoelectric element. In operation, a force is applied to the membrane 8 using an excitation signal $U_E$, for example, in the form of an alternating electrical voltage, which is generated in electronics unit 6. A change of the applied electrical voltage effects a change of the geometric shape of the driving/receiving unit 5, thus, a contraction or expansion of the piezoelectric element, in such a manner that the applying of an alternating electrical voltage as excitation signal $U_E$ brings about an oscillation of the membrane 8 connected by material bonding with the driving/receiving unit 5. Oscillation of the membrane 8 causes the mechanically oscillatable unit 4 to oscillate.

The idea of the present invention is to provide a vibronic sensor 1 with at least two oscillatory elements 11a, 11b, which are excitable separately from one another to execute mechanical oscillations, and wherein the oscillations of the two oscillatory elements 11a, 11 b can likewise be received and evaluated separately from one another. This means that the first oscillatory element 11a is excited by means of a first excitation signal $U_{E1}$ and the second oscillatory element 11b by means of a second excitation signal $U_{E1}$, and the first oscillatory element 11a receives a first received signal $U_{R1}$ and the second oscillatory element 11b a second received signal $U_{R2}$. The two excitation signals $U_{E1}$ and $U_{E2}$ can be equal or different. In the case of more than two oscillatory elements 11a-11x, it is sufficient that at least two of the oscillatory elements are excitable separately from one another and the oscillations are received and evaluated separately from one another.

The separate evaluation of the received signals $U_{R1}$ and $U_{R2}$ of the first 11a and second oscillatory element 11b enables a comprehensive evaluation of the oscillatory behavior of the sensor 1 as regards the at least one process variable. In the case of a conventional vibronic sensor 1, such as shown in FIGS. 1 and 2, the received signal is always a superpositioning of the oscillations of the two oscillatory tines 9a, 9b of the oscillatory fork 4. This results especially from the fact that the two oscillatory tines 9a, 9b are excited to execute oscillations together by means of the membrane 5, to which the driving/receiving unit is secured by material bonding.

Figure 3:
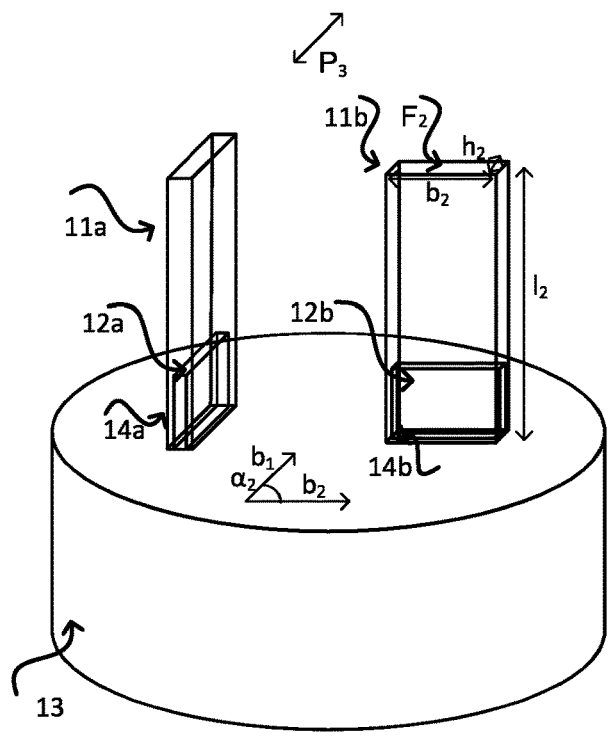
FIG. 3 shows an apparatus of the present disclosure having two oscillatory elements.

A first embodiment of the present invention is shown schematically in FIG. 3 by way of example. The vibronic sensor 1 includes a first oscillatory element 11a and a second oscillatory element 11b, each in the form of an oscillatory tine, as well as a first driving/receiving unit 12a and a second driving/receiving unit 12b. The two oscillatory tines 11a and 11b are secured on a disc shaped element 13. Both oscillatory tines 11a and 11b have, in each case, a hollow space 14a and 14b, in which in the region facing the disc shaped element 13, in each case, a driving/receiving unit 12a and 12b is arranged.

Each of the two oscillatory elements 11a, 11b is rod-shaped. For purposes of perspicuity, the following reference characters are applied only to the second oscillatory element 11b. The rod of the second oscillatory element 11b has a length 12 and a rectangular footprint $F_2$ with base $b_2$ and height $h_2$. The base $b_2$ is longer than the height $h_2$. Because of the choice of a footprint $F_2$, in the case of which a base $b_2$ is longer than a height $h_2$, the particular interaction with the medium 2 can be influenced with targeting. As already indicated, besides the shown rectangular embodiment of the footprint $F_2$, numerous other options are possible, which likewise fall within the scope of the present invention.

The first oscillatory element 11a and the second oscillatory element 11b are arranged, furthermore, differently relative to the disc shaped element 13. In the illustrated example, the two bases $b_1$ and $b_2$ of the two oscillatory elements 11a and 11b have a second predeterminable angle $\alpha_2$ in the form of a right angle between one another. Both oscillatory elements 11a and 11b are excited to execute oscillations in the same, third plane $P_3$. This leads to the fact that, for the first oscillatory element, the base $b_1$ extends in parallel with the third plane $P_3$, and therewith in parallel with the oscillation direction, while, in the case of the second oscillatory element 11b, the base $b_2$ extends perpendicularly to the third plane, and therewith perpendicularly to the oscillation direction. Therefore, the interaction of the first oscillatory element 11a and the medium 2 is dominated by a frictional force between the area formed by the base $b_1$ and length $l_1$ and the medium 2, while the interaction of the second oscillatory element 11b and the medium 2 is dominated by a compressive force between the area formed by the base $b_2$ and length $l_2$ and the medium 2. By means of the first oscillatory element 11a, thus, preferably the viscosity n of the medium 2 can be determined, while the second oscillatory element has an increased sensitivity relative to the density $\rho$ of the medium 2.

Figure 4:
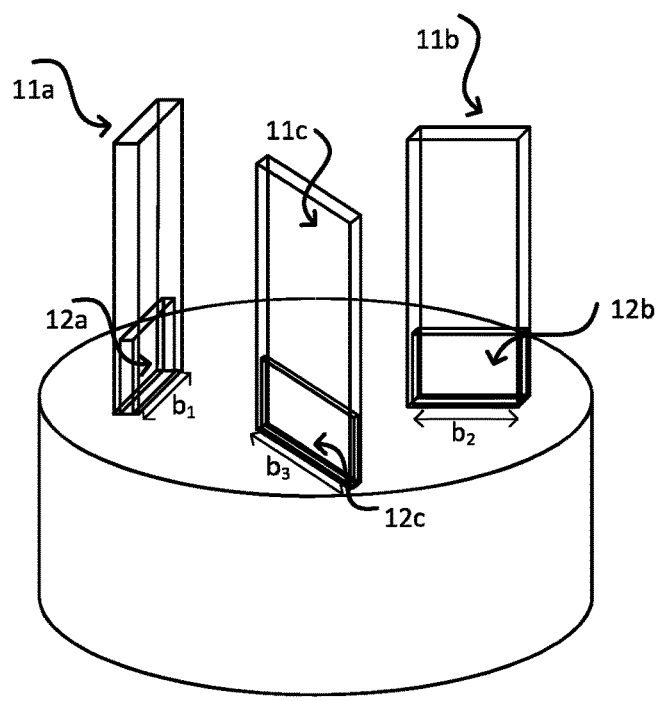
FIG. 4 shows an apparatus of the present disclosure having three oscillatory elements.

A second embodiment of the present invention is shown in FIG. 4 by way of example. Already explained reference characters are not explored in detail anew in the following figures. The sensor shown in FIG. 4 includes besides a first oscillatory element 11a and a second oscillatory element 11b, which are embodied and arranged as shown in FIG. 3, a third oscillatory element 11c as well as a third driving/receiving unit 12c. The third oscillatory element 11c is embodied identically to the first two oscillatory elements 11a and 11b. However, the third oscillatory element 11c is arranged so relative to the first two oscillatory elements 11a and 11b that the base $b_3$ of the third oscillatory element has angles of 45° relative to the first oscillatory element 11a and the second oscillatory element 11b.

Figure 5A:
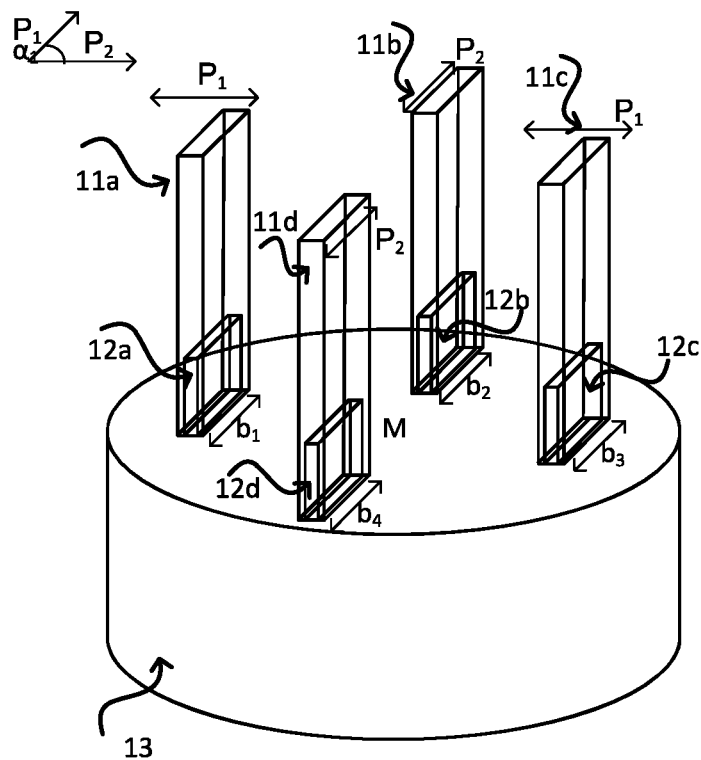
FIG. 5 shows two different embodiments of apparatuses of the present disclosure having four oscillatory elements.

Shown in FIG. 5, finally, are two different embodiments for sensor 1 of the invention with, in each case, four oscillatory elements 11a-11d and four driving/receiving units 12a-12d. As shown in FIG. 5a, all four oscillatory elements 11a-11d are embodied equally. The bases $b_1$-$b_4$ of the four oscillatory elements 11a-11d extend in parallel with one another. The oscillatory elements 11a-11d are, in each case, positioned pairwise at the same distance from the center (midpoint) M of the disc shaped element 13. A first pair is, in such case, formed here by the first oscillatory element 11a and the third oscillatory element 11c, and a second pair by the second oscillatory element 11b and the fourth oscillatory element 11d. The first pair of oscillatory elements 11a and 11c is excited to execute oscillations in a first plane $P_1$, while the second pair of oscillatory elements 11b and 11d is excited to execute oscillations in a second plane $P_2$. The two planes have a first predeterminable angle $\alpha_1$ relative to one another, which in the present example amounts to 90°. To this end, the only schematically shown drive-receiving units 12a-12d are suitably embodied for producing oscillations in the two planes $P_1$ and $P_2$.

As shown in FIG. 5a, in the case of the first pair of oscillatory elements 11a, 11c, the bases $b_1$, $b_3$ of the footprints $F_1$, $F_3$ of the oscillatory elements 11a, 11c extend perpendicularly to the plane $P_1$, thus, perpendicularly to the oscillation direction, while in the case of the second pair of oscillatory elements 11b, 11d, the bases $b_2$, $b_4$ of the footprints $F_2$, $F_4$ of the oscillatory elements 11b, 11d extend in parallel with the plane $P_2$, thus, in parallel with the oscillation direction. With the first pair of oscillatory elements 11a, 11c, thus, preferably the density p of the medium 2 can be determined, and with the second pair of oscillatory elements 11b, 11d the viscosity $\eta$.

Figure 5B:
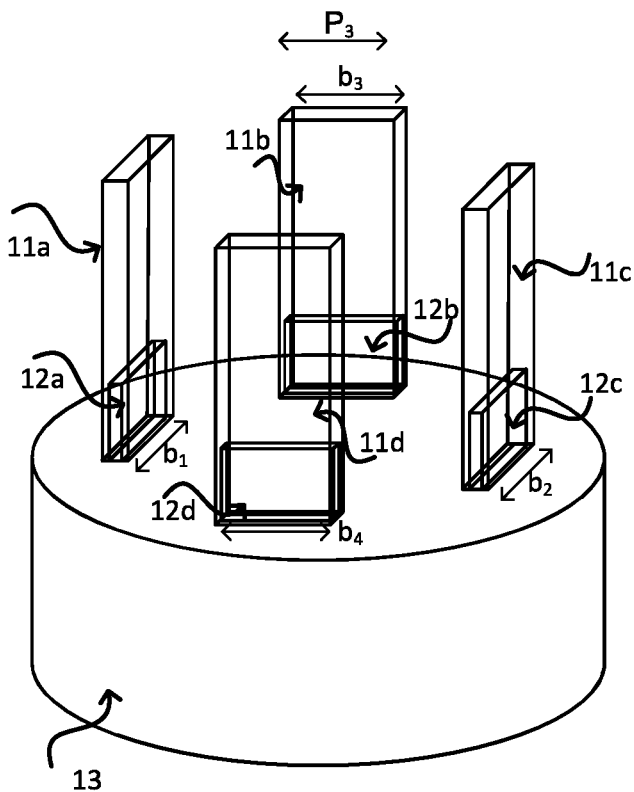

As shown in FIG. 5b, likewise all four oscillatory elements 11a-11d are embodied equally. Again, a first pair of oscillatory elements is formed by the first oscillatory element 11a and third oscillatory element 11c, and a second pair by the second oscillatory element 11b and the fourth oscillatory element 11d. The two bases $b_1$ and $b_3$ of the first pair extend in parallel with one another, wherein the first oscillatory element 11a and the third oscillatory element 11c are arranged opposite one another at the same distance from the center M [not shown in FIG. 5b] of the disc shaped element 13. Also the two bases $b_2$ and IN of the second pair of oscillatory elements extend in parallel with one another, wherein the second oscillatory element 11b and the fourth oscillatory element 11d are likewise arranged opposite one another at the same distance from the center M [not shown in FIG. 5b] of the disc shaped element 13. The bases $b_1$, $b_3$ of the first pair of 11a, 11c and the bases $b_2$, $b_4$ of the second pair of 11b, 11d have, thus, similarly as shown in FIG. 3, a second predeterminable angle $\alpha_2$ of 90° relative to one another.

All oscillatory elements 11a-11d are excited to execute oscillations in the same, third plane $P_3$. This leads to the fact that, for the first pair of oscillatory elements 11a,11c the bases $b_1$ and $b_3$ extend perpendicularly to the third plane $P_3$, and therewith in parallel with the oscillation direction, while in the case of the second pair of oscillatory elements 11b the bases $b_2$ and IN extend in parallel with the third plane $P_3$, and therewith perpendicularly to the oscillation direction.

Correspondingly, it is advantageous to determine and/or to monitor the density ρ of the medium 2 by means of the first pair of oscillatory elements 11a and 11c and the viscosity η of the medium 2 by means of the second pair of oscillatory elements 11b and 11d.

It is to be noted here that the embodiments shown in the figures are only some possible examples. The invention enables a number of other embodiments, which cannot all be shown here. Also, it is to be noted that individual components of individual embodiments can be combined with one another to the extent desired.

LIST OF REFERENCE CHARACTERS 1 vibronic sensor
2 medium
3 containment
4 oscillatable unit
5 driving/receiving unit
6 electronics unit
8 membrane
9 oscillatory tines
10 paddle
11a-11d oscillatory elements
12a-12d driving/receiving units
13 disc shaped element
14a,14b hollow spaces in the oscillatory elements
$U_E$ excitation signal
$U_R$ received signal
Δϕ predeterminable phase shift
ρ density of the medium
v viscosity of the medium
$l_1$-$l_4$ length of the oscillatory elements
F, $F_1$-$F_4$ footprints of the oscillatory elements
b, $b_1$-$b_4$ bases of the oscillatory elements
h, $h_1$-$h_4$ vertical dimensions of the oscillatory elements
$α_1$, $α_2$ predeterminable angle
$P_1$-$P_3$ oscillation planes

The invention claimed is:

1. An apparatus for determining and/or monitoring a process variable of a medium in a containment, comprising:
a first oscillatory element and a second oscillatory element;
a first driving/receiving unit and a second driving/receiving unit; and
an electronics,
wherein the first driving/receiving unit is embodied to excite the first oscillatory element using a first electrical excitation signal to execute mechanical oscillations, and to receive the mechanical oscillations of the first oscillatory element and to convert them into a first electrical, received signal,
wherein the first oscillatory element and/or the first driving/receiving unit are/is arranged and/or embodied in such a manner that the first oscillatory element executes oscillations in a first predeterminable plane,
wherein the second driving/receiving unit is embodied to excite the second oscillatory element using a second electrical excitation signal to execute mechanical oscillations, and to receive the mechanical oscillations of the second oscillatory element and to convert them into a second electrical, received signal,
wherein the second oscillatory element and/or the second driving/receiving unit are/is arranged and/or embodied in such a manner that the second oscillatory element executes oscillations in a second predeterminable plane,
wherein the first plane and the second plane have a first predeterminable angle relative to one another, and
wherein the electronics is embodied to determine the process variable from the first received signal and/or the second received signal.

2. The apparatus as claimed in claim 1, wherein the process variable is a predeterminable fill level, a density of the medium, or a viscosity of the medium.

3. The apparatus as claimed in claim 1, wherein the electronics is further embodied to determine a first process variable from the first received signal and a second process variable from the second received signal.

4. The apparatus as claimed in claim 1, wherein the electronics is further embodied to ascertain from the first and/or the second received signal a presence of an accretion on at least one of the oscillatory elements.

5. The apparatus as claimed in claim 1, wherein at least the first oscillatory element or the second oscillatory element is rod-shaped.

6. The apparatus as claimed in claim 1, wherein a paddle is formed terminally on at least the first oscillatory element or the second oscillatory element.

7. The apparatus as claimed in claim 1, wherein the first predeterminable angle is 90°.

8. The apparatus as claimed claim 1, wherein the first oscillatory element and/or the first driving/receiving unit and the second oscillatory element and/or the second driving/receiving unit are arranged and/or embodied such that the first oscillatory element and the second oscillatory element execute oscillations in a predeterminable plane.

9. The apparatus as claimed in claim 1, wherein at least the first oscillatory element or the second oscillatory element has a hollow space, and wherein at least the first driving/receiving unit or second driving/receiving unit is arranged at least partially within the hollow space.

10. The apparatus as claimed in claim 1, wherein the first oscillatory element and the second oscillatory element are mounted on a disc shaped element.

11. The apparatus as claimed in claim 1, wherein a footprint at least of the first oscillatory element or the second oscillatory element is embodied perpendicularly to a longitudinal axis of the respective oscillatory element such that a base of the footprint is longer than a height of the footprint.

12. The apparatus as claimed in claim 11, wherein the footprint is rectangular, rectangular with rounded corners, oval, or elliptical.

13. The apparatus as claimed in claim 1, further comprising:
a third oscillatory element and a fourth oscillatory element.

14. The apparatus as claimed in claim 13, wherein the first and the third oscillatory elements are embodied equally and arranged symmetrically relative to one another, and the second and the fourth oscillatory elements are embodied equally and arranged symmetrically relative to one another.

* * * * *